(12) United States Patent
Na et al.

(10) Patent No.: US 10,789,164 B2
(45) Date of Patent: Sep. 29, 2020

(54) MEMORY SYSTEM FOR PERFORMING GARBAGE COLLECTION OPERATION BASED ON VALID PAGE DECREASE AMOUNTS OF CLOSED MEMORY BLOCKS AND METHOD FOR OPERATING THE SAME

(71) Applicant: SK hynix Inc., Gyeonggi-do (KR)

(72) Inventors: Hyeong-Ju Na, Gyeonggi-do (KR); Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/225,021

(22) Filed: Dec. 19, 2018

(65) Prior Publication Data
US 2020/0019495 A1     Jan. 16, 2020

(30) Foreign Application Priority Data
Jul. 11, 2018 (KR) .................. 10-2018-0080678

(51) Int. Cl.
*G06F 12/02*     (2006.01)
*G06F 3/06*      (2006.01)
*G06F 11/07*     (2006.01)

(52) U.S. Cl.
CPC .......... *G06F 12/0253* (2013.01); *G06F 3/061* (2013.01); *G06F 3/064* (2013.01); *G06F 3/065* (2013.01); *G06F 3/0652* (2013.01); *G06F 3/0679* (2013.01); *G06F 11/073* (2013.01); *G06F 2201/81* (2013.01); *G06F 2201/88* (2013.01); *G06F 2212/7201* (2013.01); *G06F 2212/7205* (2013.01)

(58) Field of Classification Search
CPC ...... G08F 12/0253; G06F 3/061; G06F 3/064; G06F 3/065; G06F 3/0652; G06F 3/0679; G06F 11/073; G06F 2212/7201; G06F 2212/7205; G06F 2201/81; G06F 2201/88
See application file for complete search history.

(56) References Cited

U.S. PATENT DOCUMENTS

2012/0079167 A1*  3/2012  Yao .............. G06F 12/0246
                                              711/103
2017/0255405 A1*  9/2017  Zettsu ........... G06F 12/0246

FOREIGN PATENT DOCUMENTS

KR   1020160090953   8/2016
KR   1020170126063   11/2017

\* cited by examiner

*Primary Examiner* — Baboucarr Faal
*Assistant Examiner* — Jane Wei
(74) *Attorney, Agent, or Firm* — IP & T Group LLP

(57) ABSTRACT

A memory system includes: a memory device including a closed memory block; an update block detector detecting a total sum of valid page decrease amounts and the number of update blocks based on the number of valid pages of the closed memory block that are counted before and after a map update operation; and a garbage collector performing a garbage collection operation on a victim block, based on the number of free blocks in the memory device, the counted number of the update blocks and the calculated total sum of the valid page decrease amounts.

16 Claims, 12 Drawing Sheets

Case 1

1st Th : 100
2nd Th : 20
Free BLK : 50

Case 2

1st Th : 100
2nd Th : 20
Free BLK : 10

Case 1

Case 2

MEMORY SYSTEM FOR PERFORMING GARBAGE COLLECTION OPERATION BASED ON VALID PAGE DECREASE AMOUNTS OF CLOSED MEMORY BLOCKS AND METHOD FOR OPERATING THE SAME

CROSS-REFERENCE TO RELATED APPLICATION

The present application claims priority of Korean Patent Application No. 10-2018-0080678, filed on Jul. 11, 2018, which is incorporated herein by reference in its entirety.

BACKGROUND

1. Field

Various embodiments of the present disclosure generally relate to a memory system. Particularly, the disclosure relates to a memory system capable of efficiently performing a garbage collection operation and a method for operating the memory system.

2. Description of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability and durability, high information access speed, and low power consumption since they have no moving parts, as compared to the characteristics of a hard disk device. Examples of memory systems having such advantages include universal serial bus (USB) memory devices, memory cards having various interfaces, and solid state drives (SSDs).

SUMMARY

Embodiments of the present invention are directed to a memory system capable of efficiently performing a garbage collection operation.

In accordance with an embodiment of the present invention, a memory system includes: a memory device including a closed memory block; an update block detector suitable for detecting a total sum of valid page decrease amounts and the number of update blocks based on the number of valid pages of the closed memory block that are counted before and after a map update operation; and a garbage collector suitable for performing a garbage collection operation on a victim block, when the number of free blocks in the memory device is less than a first threshold value and greater than or equal to a second threshold value, and the counted number of the update blocks is greater than or equal to a third threshold value or when the number of free blocks in the memory device is less than the first threshold value and greater than or equal to the second threshold value, and the calculated total sum of the valid page decrease amounts is less than or equal to a fourth threshold value.

In accordance with another embodiment of the present invention, a method for operating a memory system includes: detecting a total sum of valid page decrease amounts and the number of update blocks based on the number of valid pages of a closed memory block that are counted before and after a map update operation; and performing a garbage collection operation on a victim block, when the number of free blocks in a memory device is less than a first threshold value and greater than or equal to a second threshold value, and the counted number of the update blocks is greater than or equal to a third threshold value or when the number of free blocks in the memory device is less than the first threshold value and greater than or equal to the second threshold value, and the calculated total sum of the valid page decrease amounts is less than or equal to a fourth threshold value.

In accordance with an embodiment of the present invention, a memory system includes: a memory device including a closed memory block; and a controller suitable for: determining the number of valid pages of the closed memory block as a first value; performing a map update operation for the memory device; determining the number of valid pages of the closed memory block as a second value; and performing a garbage collection operation on a victim block of the memory device based on the number of free blocks in the memory device, an amount of valid page decrease corresponding to a difference between the first value and the second value, and the number of update blocks corresponding to the map update operation.

DETAILED DESCRIPTION

Figure 1:
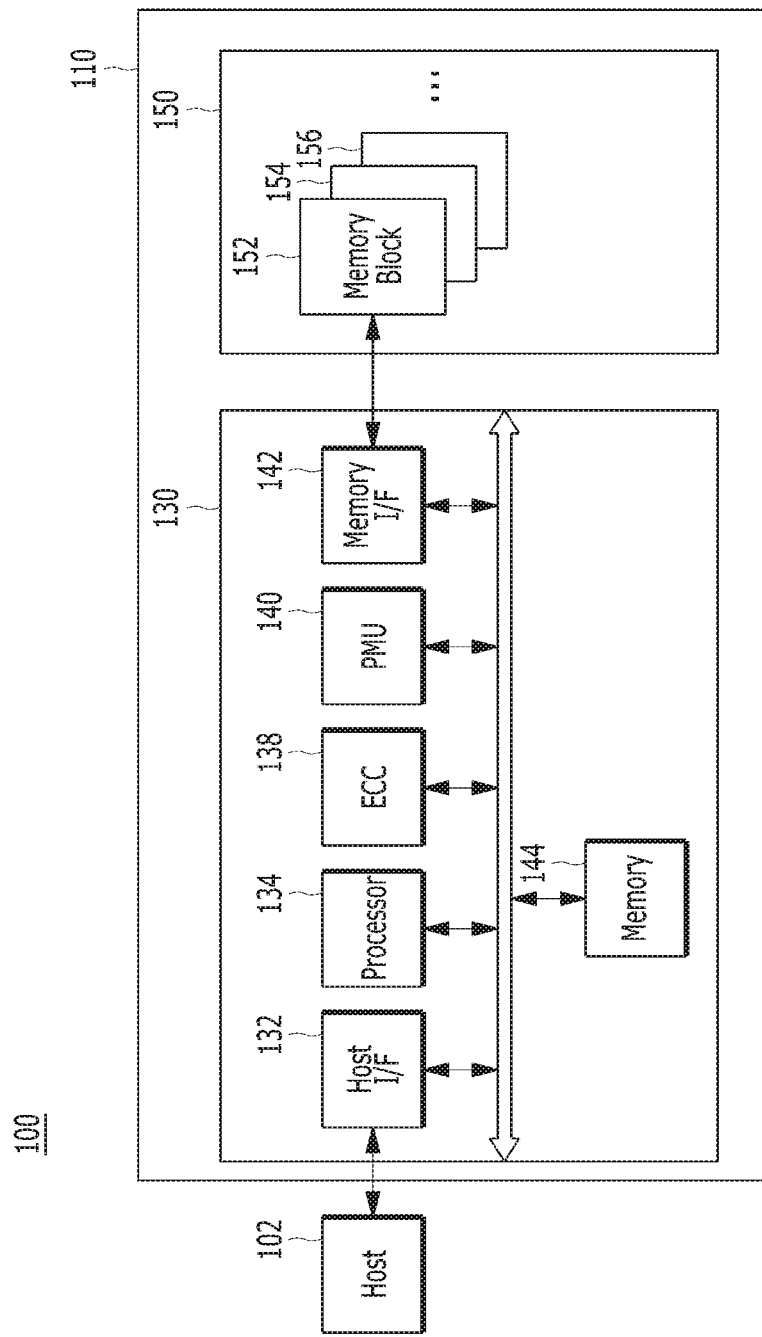
FIG. 1 is a block diagram illustrating a data processing system including a memory system in accordance with an embodiment of the present disclosure.

Various embodiments of the present disclosure will be described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention. Also, throughout the specification, reference to "an embodiment," "another embodiment" or the like is not necessarily to only one embodiment, and different references to any such phrase are not necessarily to the same embodiment(s).

It will be understood that, although the terms "first", "second", "third", and the like may be used herein to identify various elements, these elements are not limited by these terms. These terms are used to distinguish one element from another element that otherwise have the same or similar names. Thus, a first element in one instance may be termed a second or third element in another instance without departing from the spirit and scope of the present invention.

The drawings are not necessarily to scale and, in some instances, proportions may have been exaggerated to clearly illustrate features of the embodiments. When an element is referred to as being connected or coupled to another element, it should be understood that the former can be directly connected or coupled to the latter, or electrically connected or coupled to the latter via one or more intervening elements.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless the context indicates otherwise.

The terminology used herein is for describing particular embodiments and is not intended to limit the present disclosure.

As used herein, singular forms are intended to include the plural forms and vice versa, unless the context clearly indicates otherwise.

It will be further understood that the terms "comprises", "comprising," "includes," and "including" when used in this specification, specify the presence of the stated elements but do not preclude the presence or addition of one or more other elements. As used herein, the term "and/or" includes any and all combinations of one or more of the listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and not be interpreted in an idealized or overly formal sense unless expressly so defined herein.

In the following description, numerous specific details are set forth to provide a thorough understanding of the present invention. The present invention may be practiced without some or all of these specific details. In other instances, well-known process structures and/or processes have not been described in detail to not unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present disclosure.

Referring to FIG. 1, the data processing system 100 may include a host 102 operatively coupled to the memory system 110.

The host 102 may include any of a variety of portable electronic devices such as a mobile phone, a MP3 player and a laptop computer, or any of a variety of non-portable electronic devices such as a desktop computer, a game machine, a television (TV) and a projector.

The host 102 may include at least one operating system (OS), which may manage and control overall functions and operations of the host 102. The OS may support an operation between the host 102 and a user using the data processing system 100 or the memory system 110. The OS may support functions and operations requested by a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS may be configured to support a function of providing a mobile service to users, and a power saving function of a system may include Android, iOS and Windows Mobile. The host 102 may include a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request.

The memory system 110 may store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card and a memory stick. The MMC may include an embedded MMC (eMMC), a reduced size MMC (RS-MMC) and micro-MMC. The SD card may include a mini-SD card and micro-SD card.

The memory system 110 may include various types of storage devices. Non-limiting examples of such storage devices include volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device, which may be included in any of the various types of memory systems as described above. For example, the controller 130 and the memory device 150 may be integrated as a single semiconductor device to constitute an SSD. When the memory system 110 is used as an SSD, the operating speed of the host 102 connected to the memory system 110 can be improved. In another example, the controller 130 and the memory device 150 may be integrated as a single semiconductor device to constitute a memory card such as a personal computer memory card international association (PCMCIA) card, a CompactFlash (CF) card, a smart media card (SMC), a memory stick, a multi-media card (MMC) including a reduced size MMC (RS-MMC) and a micro-MMC, a secure digital (SD) card including a mini-SD, a micro-SD and a SDHC, or an universal flash storage (UFS) device.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The structure of the memory device 150 and the 3D stack structure of the memory device 150 will be described in detail below with reference to FIGS. 2 to 4.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

More specifically, the controller 130 may include a host interface (I/F) 132, a processor 134, an error correction code (ECC) component 138, a power management unit (PMU) 140, a memory interface 142, and a memory 144, all operatively coupled or engaged via an internal bus.

The host interface 132 may process a command and data of the host 102. The host interface 132 may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI) and integrated drive electronics (IDE). The host interface 132 may be driven via firmware, that is, a host interface layer (HIL) for exchanging data with the host 102.

Further, the ECC component 138 may correct error bits of data to be processed by the memory device 150 and may include an ECC encoder and an ECC decoder. The ECC encoder may perform an error correction encoding on data to be programmed into the memory device 150 to generate data to which a parity bit is added. The data including the parity bit may be stored in the memory device 150. The ECC decoder may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC component 138 may output a signal, for example, an error correction success or fail signal. When the number of error bits is more than a threshold value of correctable error bits, the ECC component 138 may not correct the error bits, and instead may output the error correction fail signal.

The ECC component 138 may perform error correction through a coded modulation such as a low density parity check (LDPC) code, a Bose-Chaudhri-Hocquenghem (BCH) code, a turbo code, a Reed-Solomon (RS) code, a convolution code, a recursive systematic code (RSC), a trellis-coded modulation (TCM) and a block coded modulation (BCM). However, the ECC component 138 is not limited to these error correction techniques. As such, the ECC unit 138 may include any and all circuits, modules, systems or devices for performing suitable error correction.

The PMU 140 may manage electrical power used and provided in the controller 130.

The memory interface 142 may serve as a memory or storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130. The controller 130 may control the memory device 150 to perform read, program, and erase operations in response to a request from the host 102. The controller 130 may provide data read from the memory device 150 to the host 102, and may store data provided from the host 102 into the memory device 150. The memory 144 may store data required for the controller 130 and the memory device 150 to perform these operations.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In an embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150 and other data required for the controller 130 and the memory device 150 to perform these operations.

The processor 134 may control overall operations of the memory system 110. The processor 134 may use firmware to control the overall operations of the memory system 110. The firmware may be referred to as flash translation layer (FTL).

For example, the controller 130 may perform an operation requested by the host 102 in the memory device 150 through the processor 134, which is implemented as a microprocessor, a CPU, or the like. Also, the controller 130 may perform a background operation on the memory device 150 through the processor 134, which may be realized as a microprocessor or a CPU. The background operation performed on the memory device 150 may include an operation of copying and processing data stored in some memory blocks among the memory blocks 152 to 156 of the memory device 150 into other memory blocks, e.g., a garbage collection (GC) operation, an operation of performing swapping between the memory blocks 152 to 156 or between the data of the memory blocks 152 to 156, e.g., a wear-leveling (WL) operation, an operation of storing the map data stored in the controller 130 in the memory blocks 152 to 156, e.g., a map flush operation, or an operation of managing bad blocks of the memory device 150, e.g., a bad block management operation of detecting and processing bad blocks among the memory blocks 152 to 156 in the memory device 150.

The memory device of the memory system in accordance with an embodiment of the present disclosure is described in detail with reference to FIGS. 2 to 4.

Figure 2:
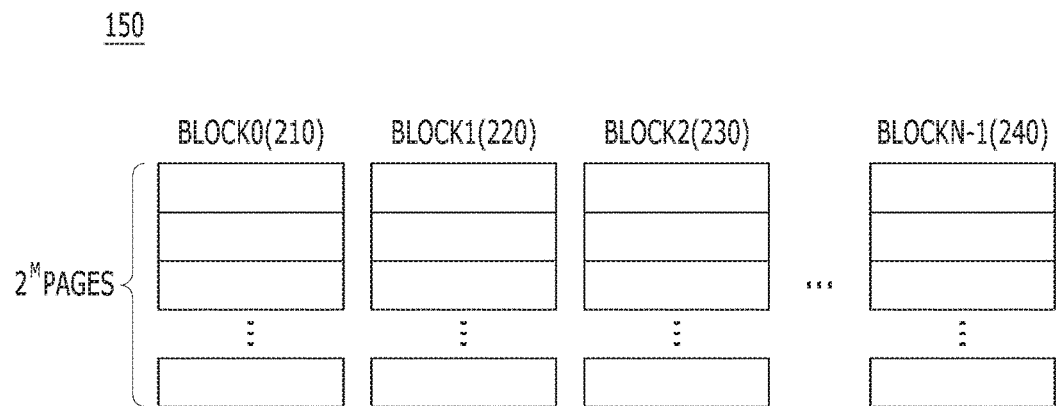
FIG. 2 is a schematic diagram illustrating an exemplary configuration of a memory device employed in the memory system shown in FIG. 1.

FIG. 2 is a schematic diagram illustrating the memory device 150 of the memory system 110 in FIG. 1. FIG. 3 is a circuit diagram illustrating an exemplary configuration of a memory cell array of a memory block 330 representative of any of the in the memory device 150. FIG. 4 is a schematic diagram illustrating an exemplary three-dimensional (3D) structure of the memory device 150.

Referring to FIG. 2, the memory device 150 may include a plurality of memory blocks BLOCK0 to BLOCKN−1, where N is an integer greater than 1. Each of the blocks BLOCK0 to BLOCKN−1 may include a plurality of pages, for example, $2^M$ or M pages, the number of which may vary according to circuit design, M being an integer greater than 1. Each of the pages may include a plurality of memory cells that are coupled to a plurality of word lines WL.

Memory cells in the respective memory blocks BLOCK0 to BLOCKN−1 may be one or more of a single level cell (SLC) storing 1-bit data or a multi-level cell (MLC) storing 2-bit data. Hence, the memory device 150 may include memory blocks of SLC cells or MLC cells, depending on the number of bits to be expressed or stored in each of the memory cells. The SLC memory blocks may include a plurality of pages which are embodied by SLC memory cells, each storing one-bit data. The SLC memory blocks may generally have higher data computing performance and higher durability than the MLC memory blocks. The MLC memory blocks may include a plurality of pages which are embodied by MLC memory cells each storing multi-bit data (for example, 2 or more bits). The MLC memory blocks may generally have larger data storage space, that is, higher integration density, than the SLC memory blocks. In another embodiment, the memory device 150 may include a plurality of triple level cell (TLC) memory blocks. In yet another embodiment, the memory device 150 may include a plurality of quadruple level cell (QLC) memory blocks. The TLC memory blocks may include a plurality of pages which are embodied by memory cells each capable of storing 3-bit data. The QLC memory blocks may include a plurality of pages which are embodied by memory cells each capable of storing 4-bit data.

Instead of a nonvolatile memory, the memory device 150 may implemented by any one of a phase change random access memory (PCRAM), a resistive random access memory (RRAM or ReRAM), a ferroelectrics random access memory (FRAM), and a spin transfer torque magnetic random access memory (STT-RAM).

The memory blocks 210, 220, 230, 240 may store the data transferred from the host 102 through a program operation, and may transfer data stored therein to the host 102 through a read operation.

Figure 3:
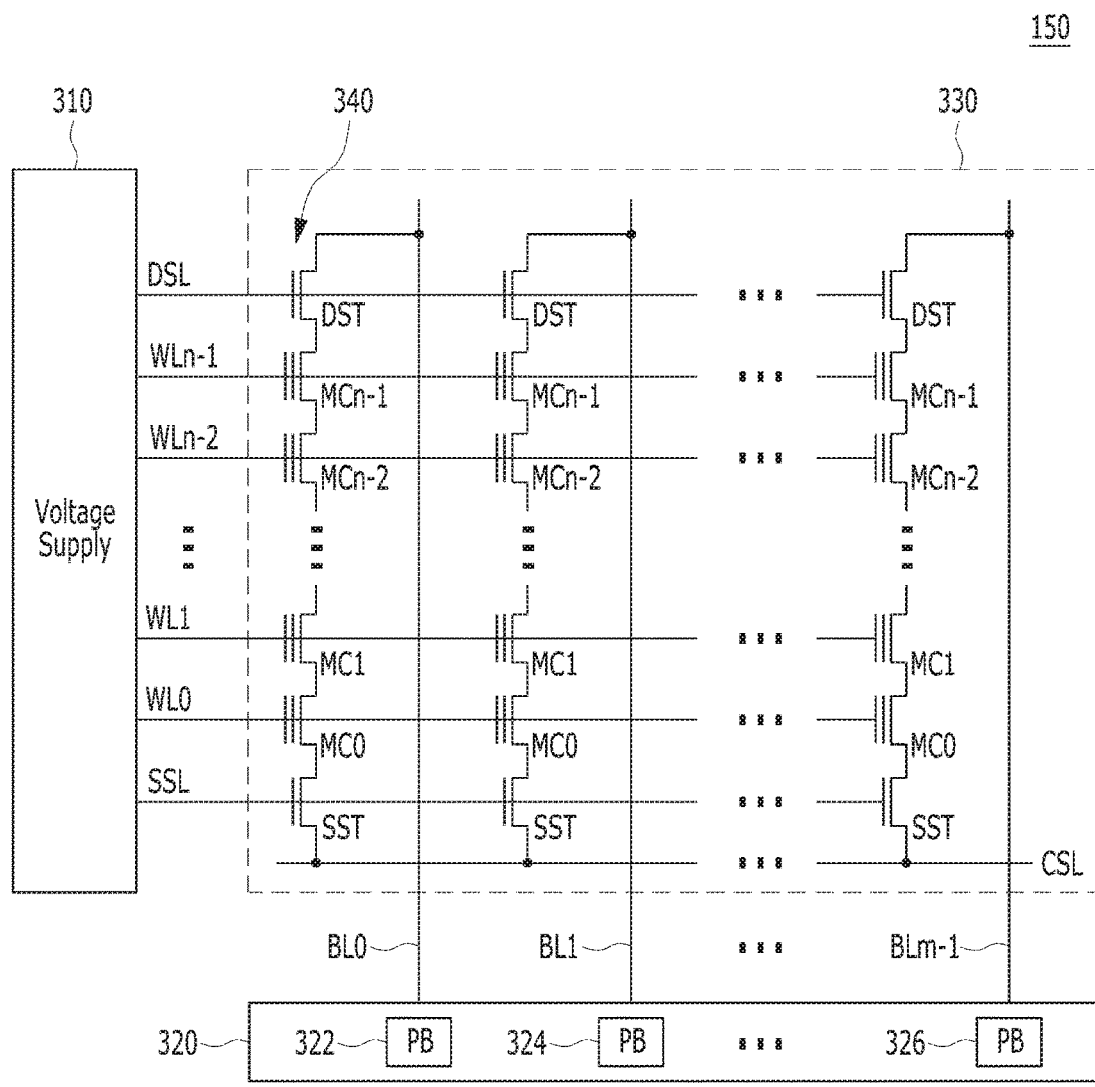
FIG. 3 is a circuit diagram illustrating an exemplary configuration of a memory cell array of a memory block in the memory device shown in FIG. 1.
Figure 4:
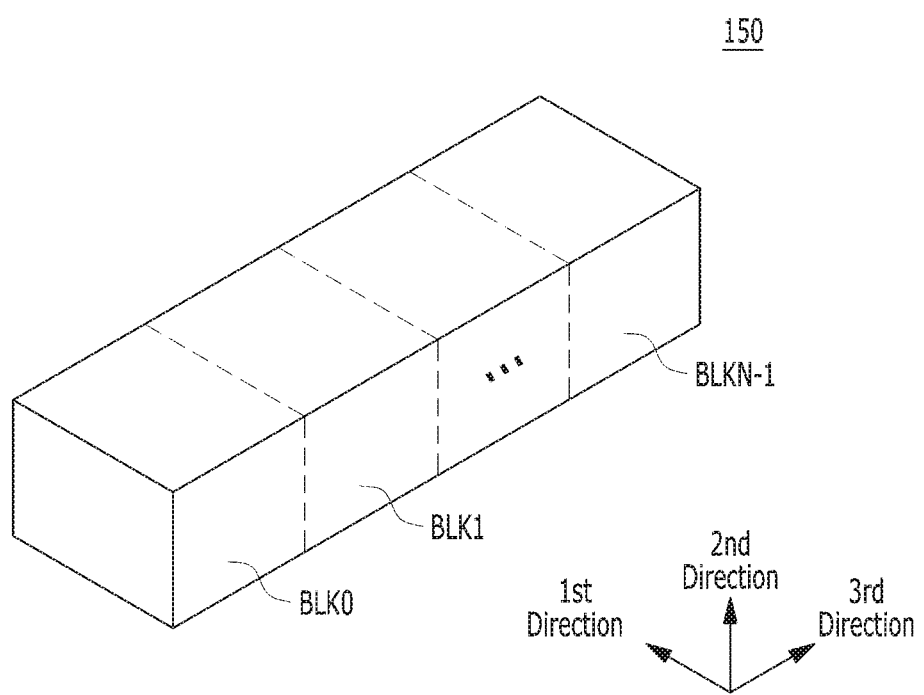
FIG. 4 is a block diagram illustrating a structure of a memory device of a memory system in accordance with an embodiment of the present disclosure.

Referring to FIG. 3, the memory block 330, which is representative of any of the memory blocks 152, 154, 156, may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the present disclosure is not limited thereto. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which generates different word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select at least one of the memory blocks (or sectors) of the memory cell array, select at least one of the word lines of the selected memory block, and provide the word line voltages to the selected word line(s) and the unselected word lines as may be needed.

The memory device 150 may include a read and write (read/write) circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be embodied by a 2D or 3D memory device. Particularly, as illustrated in FIG. 4, the memory device 150 may be embodied by a nonvolatile memory device having a 3D stack structure. When the memory device 150 has a 3D structure, the memory device 150 may include a plurality of 3D memory blocks BLK0 to BLKN−1. As shown in FIG. 4, each of the memory blocks 152, 154 and 156 of the memory device 150 may be realized in a 3D structure (or vertical structure). For example, the memory blocks 152, 154 and 156 may be a three-dimensional structure extending in three mutually orthogonal directions, e.g., an x-axis direction, a y-axis direction, and a z-axis direction as shown in FIG. 4.

Each memory block 330 included in the memory device 150 may include a plurality of NAND strings NS that extend in the second direction, and a plurality of NAND strings NS that extend in the first direction and the third direction. Herein, each of the NAND strings NS may be coupled to a bit line BL, at least one string selection line SSL, at least one ground selection line GSL, a plurality of word lines WL, at least one dummy word line DWL, and a common source line CSL, and each of the NAND strings NS may include a plurality of transistor structures TS.

In short, each memory block 330 may be coupled to a plurality of bit lines BL, a plurality of string selection lines SSL, a plurality of ground selection lines GSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a string selection transistor SST of each NAND string NS may be coupled to a corresponding bit line BL, and a ground selection transistor GST of each NAND string NS may be coupled to a common source line CSL. Herein, memory cells MC may be provided between the string selection transistor SST and the ground selection transistor GST of each NAND string NS. In other words, a plurality of memory cells may be realized in each memory block 330 of the memory blocks 152, 154 and 156 of the memory device 150.

Generally, the flash memory may perform a program operation and a read operation on a page basis, perform an erase operation on a block basis, and may not support an overwrite operation unlike a hard disk. Therefore, to modify original data programmed into a page, the flash memory may program modified data into a new page and invalidate the page of the original data.

The garbage collection operation may refer to an operation of periodically converting the invalidated page into an empty page in order to prevent a memory space from being inefficiently used due to the invalidated pages in the process of modifying data. The garbage collection operation may include copying the data programmed in a valid page of a victim block into an empty page of a target block. The memory space may be recovered according to the garbage collection operation. However, the performance of a foreground operation, which is performed in response to a request from the host 102, may be degraded.

In a case where performance of a foreground operation is prioritized rather than recovery of the memory space, degradation of the performance of the foreground operation may be prevented by lowering the frequency at which the garbage collection operation is performed. When a sequential program command is provided from the host 102 or commands for continuously updating a particular file are provided, the number of invalid pages may increase intensively in a particular memory block. Since the victim blocks are generated slowly when the program operation is intensively performed in the particular memory block, the controller 130 may lower the frequency of performing the garbage collection operation by giving priority to the performance of the foreground operation rather than recovering the memory space in order to improve the performance of a foreground operation.

Generally, when the number of free blocks is less than a predetermined threshold value, the controller 130 may unconditionally perform a garbage collection operation on a victim block. Therefore, a situation in which priority is given to maintaining the performance of a foreground operation rather than recovering a free block is not taken into consideration.

In various embodiments, the controller 130 may maintain the performance of a foreground operation even in a situation in which the number of free blocks is insufficient by dynamically changing the frequency of performing a garbage collection. The controller 130 may dynamically change the frequency of performing a garbage collection by detecting a workload of intensively performing a program operation in a particular memory block, based on the number (i.e., $\Delta$BLY) of update blocks and the total sum (i.e., $\Sigma\Delta$VPC) of the valid page decrease amounts that are counted before and after a map update operation in a closed memory block.

Figure 5:
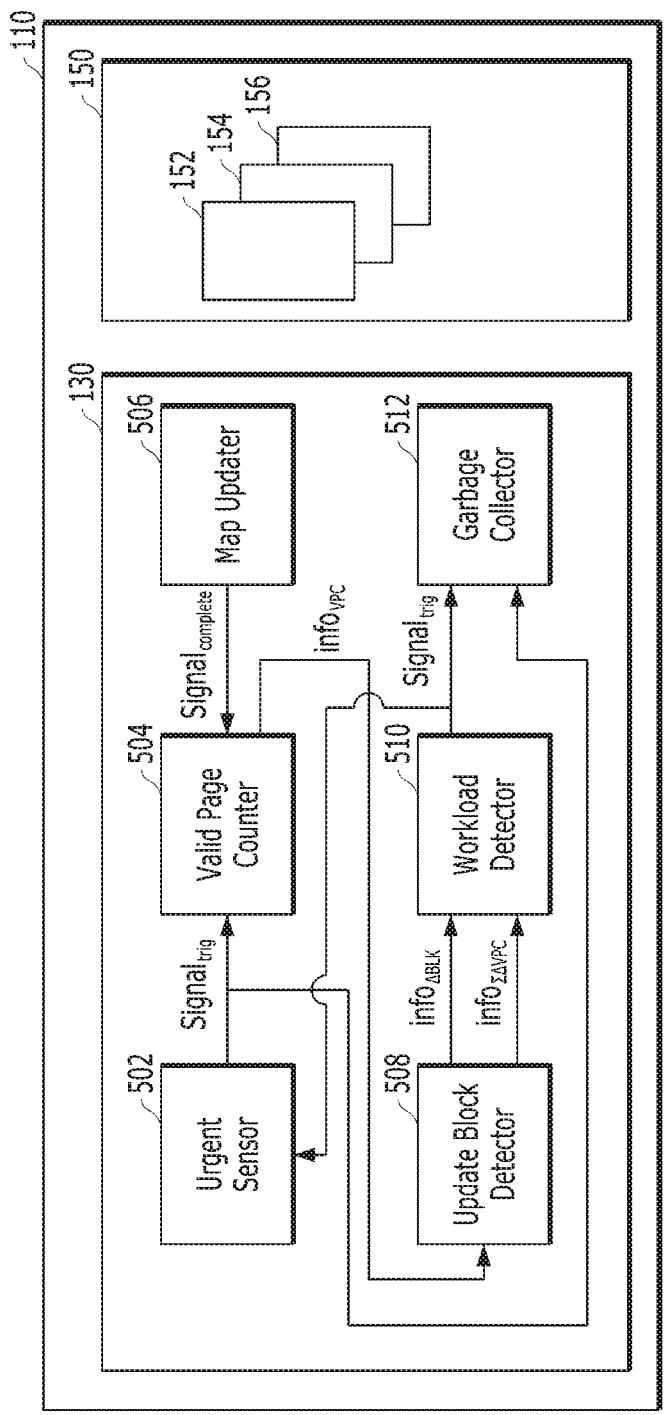
FIG. 5 is a block diagram illustrating a structure of a memory system in accordance with an embodiment of the present disclosure.

FIG. 5 is a block diagram illustrating a structure of the memory system 110 in accordance with an embodiment of the present disclosure. For example, FIG. 5 shows the constituent elements related to the present disclosure in the data processing system 100 of FIG. 1.

As described above, the memory system 110 may include the memory device 150 and the controller 130. The controller 130 may control a program operation of the memory device 150, and perform a garbage collection operation to recover memory space.

Referring to FIG. 5, the controller 130 may further include an urgent sensor 502, a valid page counter 504, a map updater 506, an update block detector 508, a workload detector 510, and a garbage collector 512.

The urgent sensor 502 may count the number of free blocks whose number of blank pages is greater than or equal to a set threshold value, which may be predetermined. The urgent sensor 502 may provide a trigger signal $Signal_{trig}$ to the valid page counter 504 when the counted number of the free blocks is less than a first threshold value $TH_1$ and greater than or equal to a second threshold $TH_2$. The urgent sensor 502 may provide the trigger signal $Signal_{trig}$ to the garbage collector 512 as described below when the counted number of the free blocks is less than the second threshold $TH_2$.

The valid page counter 504 may count the number of valid pages $VPC_{Before}$ of each of the closed memory blocks in the memory device 150 according to the received trigger signal $Signal_{trig}$. Each of the closed memory blocks may be a memory block whose number of valid pages is not zero (i.e., 0) and which is not an open block where a program operation is performed.

The map updater 506 may update the address information of the data (i.e., host data) programmed in the memory block. The map updater 506 may periodically update the address which is changed as the original data programmed in a page is modified. The map updater 506 may provide a complete signal $Signal_{complete}$ to the valid page counter 504, when a map update operation is performed on all the memory blocks included in the memory device 150.

The valid page counter 504 may count the number of valid pages $VPC_{After}$ of the closed memory blocks that are included in the memory device 150 after a map update operation is performed according to the received complete signal $Signal_{complete}$. The valid page counter 504 may provide information $info_{VPC}$ to the update block detector 508. The information $info_{VPC}$ may include information about the number of the valid pages (valid page information) of each of the closed memory blocks that are counted before and after the map update operation.

The update block detector 508 may calculate a valid page decrease amount $\Delta$VPC for each of the closed memory blocks according to the received valid page information $info_{VPC}$. The update block detector 508 may calculate the difference between the number of the valid pages $VPC_{After}$ and the number of the valid pages $VPC_{Before}$ as the aforementioned valid page decrease amount ΔVPC.

The update block detector 508 may obtain the total sum ΣΔVPC of the valid page decrease amounts based on the valid page decrease amounts ΔVPC that are respectively calculated for the closed memory blocks. The update block detector 508 may obtain the total sum of a plurality of valid page decrease amounts ΔVPC that are respectively calculated for the closed memory blocks as the total sum ΣΔVPC of the valid page decrease amounts. The update block detector 508 may provide information $info_{ΣΔVPC}$ about the total sum of the valid page decrease amounts to the workload detector 510.

The update block detector 508 may detect a closed memory block having a change in the number of the valid pages before and after the map update operation as the update block based on the valid page decrease amounts ΔVPC respectively calculated for the closed memory blocks. The update block detector 508 may detect closed memory blocks whose calculated valid page decrease amount ΔVPC is not 0 as the update blocks. The update block detector 508 may count the number ΔBLK of the detected update blocks and provide update block count information $info_{ΔBLK}$ to the workload detector 510.

The workload detector 510 may compare the number ΔBLK of the update blocks with a third threshold value $TH_3$ based on the received update block count information $info_{ΔBLK}$. Further, the workload detector 510 may compare the total sum ΣΔVPC of the valid page decrease amounts with a fourth threshold value $TH_4$ based on the received information $info_{ΣΔVPC}$ about the total sum of the valid page decrease amounts. The workload detector 510 may provide the trigger signal $Signal_{trig}$ to the garbage collector 512, when the number of the update blocks ΔBLK is greater than or equal to the third threshold value $TH_3$.

The workload detector 510 may provide the trigger signal $Signal_{trig}$ to the garbage collector 512, when the total sum ΣΔVPC of the valid page decrease amounts is less than or equal to the fourth threshold value $TH_4$. The workload detector 510 may provide the trigger signal $Signal_{trig}$ to the urgent sensor 502, when the total sum ΣΔVPC of the valid page decrease amounts is greater than the fourth threshold value $TH_4$. The urgent sensor 502 may provide the trigger signal $Signal_{trig}$ to the garbage collector 512, when the number of the free blocks is less than the second threshold value $TH_2$ based on the trigger signal $Signal_{trig}$.

The garbage collector 512 may perform a garbage collection operation on victim blocks based on the received trigger signal $Signal_{trig}$. According to an embodiment of the present disclosure, the garbage collector 512 may detect a memory block whose number of the valid pages is less than or equal to a threshold value as a victim block. The garbage collector 512 may copy a data programmed in a valid page of the victim block into an empty page of a target block.

Figure 6:
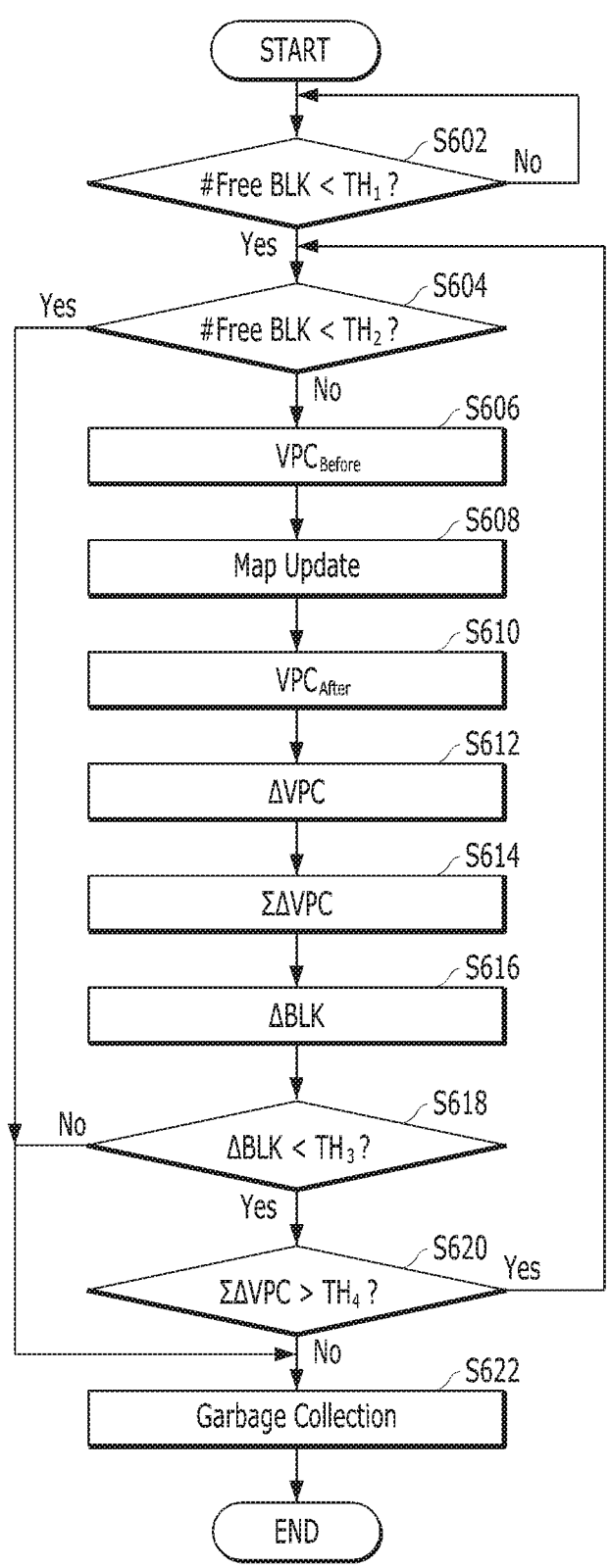
FIG. 6 is a flowchart illustrating an operation of a memory system in accordance with an embodiment of the present disclosure.

FIG. 6 is a flowchart illustrating an operation of a memory system, e.g., memory system 110 of FIG. 5, in accordance with an embodiment of the present disclosure.

Referring to FIG. 6, at step S602, the urgent sensor 502 may compare the number of the free blocks with the first threshold value $TH_1$ by counting the number of the free blocks. The urgent sensor 502 may continue to compare the number of the free blocks with the first threshold value $TH_1$, when it is determined in the immediately previous comparison that the number of the free blocks is greater than or equal to the first threshold value $TH_1$ ('No' at step S602).

When the number of the free blocks is determined to be less than the first threshold value $TH_1$ ('Yes' at step S602), the urgent sensor 502 may compare the number of the free blocks with the second threshold value $TH_2$ at step S604. The urgent sensor 502 may provide the trigger signal $Signal_{trig}$ to the garbage collector 512, when the number of the free blocks is less than the second threshold value $TH_2$ ('Yes' at step S604). The urgent sensor 502 may provide the trigger signal $Signal_{trig}$ to the valid page counter 504, when the number of the free blocks is equal to or greater than the second threshold value $TH_2$ ('No' at step S604).

Figure 7:
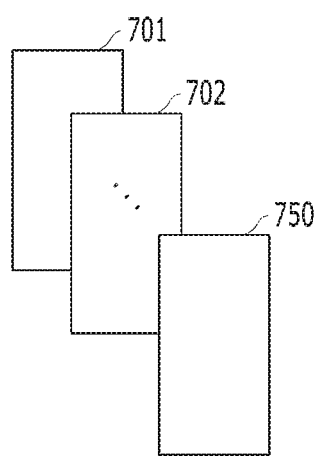
FIG. 7 illustrates an example of a garbage collection operation based on a first threshold value and a second threshold value in accordance with an embodiment of the present disclosure.
Figure 7:
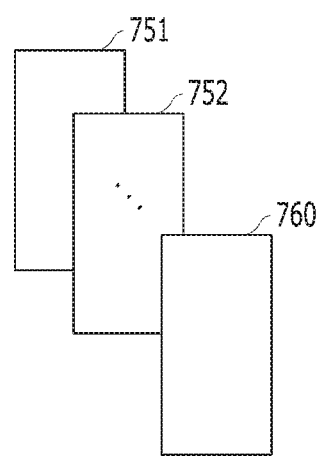

FIG. 7 illustrates an example of a garbage collection operation based on a first threshold value and a second threshold value in accordance with an embodiment of the present disclosure.

As described above, according to an embodiment of the present disclosure, a free block may be a block whose number of valid pages is greater than or equal to a threshold value. For example, when the number of the valid pages included in a particular memory block is 100 or more, the memory block may be a free block. In case 1 of FIG. 7, the number of the free blocks 701 to 750 in the memory device 150 is 50, the first threshold value $TH_1$ is 100, and the second threshold value $TH_2$ is 20. Since the number of the free blocks 701 to 750 is less than the first threshold value $TH_1$ and greater than or equal to the second threshold value $TH_2$, the urgent sensor 502 may decide whether to perform a garbage collection operation or not based on the number of the update blocks ΔBLK and the total sum ΣΔVPC of the valid page decrease amount, by providing the trigger signal $Signal_{trig}$ to the valid page counter 504.

In case 2 of FIG. 7, the number of the free blocks 751 to 760 included in the memory device 150 is 10, the first threshold value $TH_1$ is 100 and the second threshold value $TH_2$ is 20. Since the number of the free blocks 751 to 760 is less than the second threshold value $TH_2$, the urgent sensor 502 may perform a garbage collection operation by providing the trigger signal $Signal_{trig}$ to the garbage collector 512.

According to an embodiment of the present disclosure, even when the number of the free blocks is less than the first threshold value $TH_1$, the urgent sensor 502 may not unconditionally perform a garbage collection operation. When a workload in which invalid pages intensively appear in a particular block is detected based on the number of the update blocks ΔBLK and the total sum ΣΔVPC of the valid page decrease amounts, the urgent sensor 502 may improve the performance of a foreground operation by skipping a garbage collection operation by giving priority to the performance of a foreground operation rather than the recovery of the memory space. However, when the number of the free blocks is less than the second threshold value $TH_2$, the empty space may be obtained by unconditionally performing a garbage collection operation by giving the highest priority to the recovery of the memory space.

Referring back to FIG. 6, at step S606, the valid page counter 504 may count the number of the valid pages $VPC_{Before}$ of each of the closed memory blocks in the memory device 150 based on the trigger signal $Signal_{trig}$ received from the step S604. Each of the closed memory block may be a memory block whose number of the valid pages is not 0 and which is not an open block where a program operation is performed.

At step S608, the map updater 506 may update the address information of the data (i.e., host data) programmed in the memory block. The map updater 506 may periodically update the address which is changed as the original data programmed in a page is modified. The map updater 506 may provide a complete signal Signal$_{complete}$ to the valid page counter 504, when a map update operation is performed on all the memory blocks in the memory device 150.

At step S610, the valid page counter 504 may perform an update operation based on the complete signal Signal$_{complete}$ obtained at the step S608. Then, the valid page counter 504 may count the number of the valid pages VPC$_{After}$ of each of the closed memory blocks in the memory device 150. The valid page counter 504 may provide the valid page information info$_{VPC}$ to the update block detector 508.

At step S612, the update block detector 508 may calculate the valid page decrease amount ΔVPC for each memory block based on the valid page information info$_{VPC}$ obtained at step S610. The update block detector 508 may calculate the valid page decrease amount ΔVPC by calculating the difference between the number of the valid pages VPC$_{After}$ and the valid pages VPC$_{Before}$ of the closed memory blocks. The number of the valid pages VPC$_{After}$ of the closed memory blocks may be counted after the map update operation is performed. The number of the valid pages VPC$_{Before}$ of the closed memory blocks may be counted before the map update operation is performed.

At step S614, the update block detector 508 may calculate the total sum ΣΔVPC of the valid page decrease amounts based on the valid page decrease amount ΔVPC which is calculated for each memory block at the step S612. The update block detector 508 may calculate the sum of a plurality of the valid page decrease amounts ΔVPC calculated for the respective memory blocks as the total sum ΣΔVPC of the valid page decrease amounts. The update block detector 508 may provide the information info$_{ΣΔVPC}$ about the total sum of the valid page decrease amounts to the workload detector 510.

At step S616, the update block detector 508 may detect a closed memory block having a change in the number of the valid pages before and after the map update operation based on the valid page decrease amount ΔVPC calculated for each memory block at the step S612 as an update block. The update block detector 508 may detect the closed memory blocks whose valid page decrease amount ΔVPC calculated at the step S612 is not 0 as the update blocks. The update block detector 508 may count the number of the detected update blocks ΔBLK and provide update block count information info$_{ΔBLK}$ to the workload detector 510.

At step S618, the workload detector 510 may compare the number of the update blocks ΔBLK with the third threshold value TH$_3$ based on the update block count information info$_{ΔBLK}$ provided at the step S616. The workload detector 510 may provide the trigger signal Signal$_{trig}$ to the garbage collector 512, when the number of the update blocks ΔBLK is greater than or equal to the third threshold value TH$_3$ ('No' at step S618).

When the number of the update blocks ΔBLK is less than the third threshold value TH$_3$ ('Yes' at the step S618), at step S620, the workload detector 510 may compare the total sum ΣΔVPC of the valid page decrease amounts with the fourth threshold value TH$_4$ based on the information info$_{ΣΔVPC}$ about the total sum of the valid page decrease amounts provided at the step S614. The workload detector 510 may provide the trigger signal Signal$_{trig}$ to the garbage collector 512, when the total sum ΣΔVPC of the valid page decrease amounts is less than or equal to the fourth threshold value TH$_4$ ('No' at the step S620). When the total sum ΣΔVPC of the valid page decrease amounts is greater than the fourth threshold value TH$_4$ ('Yes' at the step S620), the workload detector 510 may return to the step S604.

Figure 8:
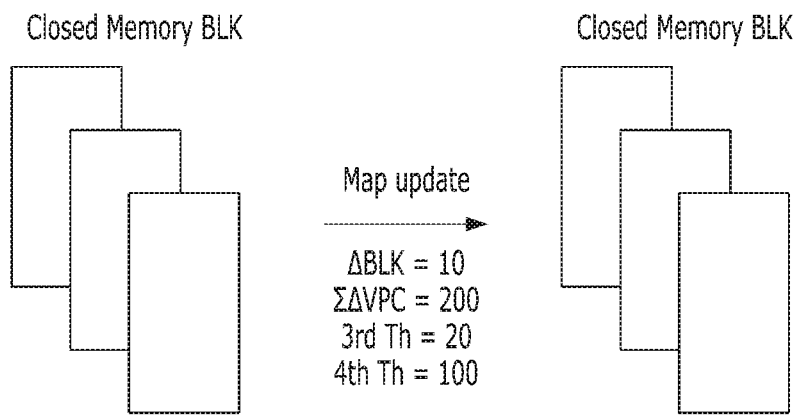
FIG. 8 illustrates an example of a garbage collection operation based on a third threshold value and a fourth threshold value in accordance with an embodiment of the present disclosure.
Figure 8:
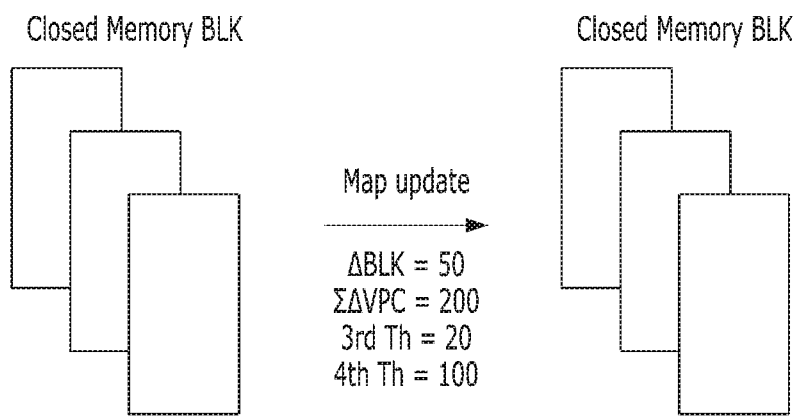

FIG. 8 illustrates an example of a garbage collection operation based on a third threshold value and a fourth threshold value in accordance with an embodiment of the present disclosure.

In case 1 of FIG. 8, the number of the update blocks ΔBLK and the total sum ΣΔVPC of the valid page decrease amounts are 10 and 200, respectively, and the third and fourth threshold values TH$_3$ and TH$_4$ are 20 and 100, respectively. As such, the number of the update blocks ΔBLK is less than the third threshold value TH$_3$, and the total sum ΣΔVPC of the valid page decrease amounts is greater than the fourth threshold value TH$_4$. Therefore, the workload detector 510 may not perform a garbage collection operation but go back to the step S604. Then, when the number of the free blocks is less than second threshold value TH$_2$, the workload detector 510 may perform a garbage collection operation.

In case 2 of FIG. 8, the number of the update blocks ΔBLK and the total sum ΣΔVPC of the valid page decrease amounts are 50 and 200, respectively, and the third and fourth threshold values TH$_3$ and TH$_4$ are 20 and 100, respectively. As such, the number of the update blocks ΔBLK is greater than the third threshold value TH$_3$, even though the total sum ΣΔVPC of the valid page decrease amounts is greater than the fourth threshold value TH$_4$. Therefore, the workload detector 510 may perform a garbage collection operation by providing the Signal$_{trig}$ to the garbage collector 512.

To compare the case 1 with the case 2, the total sum ΣΔVPC of the valid page decrease amounts of the case 1 and the case 2 may be the same. However, whether or not the garbage collection operation is to be performed may be decided based on the number of the update blocks ΔBLK. When a sufficiently large amount of the valid pages is reduced before and after a map update operation, and when the number of the closed memory blocks where the reduction in the number of the valid pages has occurred is sufficiently small, the workload detector 510 may decide it as workload where invalid pages are intensively generated in a particular block, i.e., the update block. Then, the workload detector 510 may skip a garbage collection operation by giving a priority to the performance of a foreground operation rather than the recovery of the memory space. In this way, the performance of a foreground operation may be improved even though the number of the free blocks is insufficient.

Returning back to FIG. 6, at step S622, the garbage collector 512 may perform a garbage collection operation on victim blocks based on the trigger signal Signal$_{trig}$ provided at the steps S604, S618, and S620. The garbage collector 512 may perform a garbage collection operation by copying the data programmed in the valid page of the victim block into the empty page of the target block and recovering the memory space of the victim block.

As described above, the memory system in accordance with an embodiment of the present disclosure may not unconditionally perform the garbage collection operation when the number of the free blocks is less than the first threshold value TH$_1$. Further, the memory system may dynamically change the frequency of performing the garbage collection operation in consideration of the total sum ΣΔVPC of the valid page decrease amounts and the number of the update blocks ΔBLK.

When the total sum ΣΔVPC of the valid page decrease amounts is greater than the third threshold value TH$_3$ and the number of the update blocks ΔBLK is less than the fourth threshold value TH$_4$, the memory system may decide it as workload where invalid pages are intensively generated in the small number of the update blocks, and skip a garbage collection operation by giving priority to the performance of a foreground operation rather than the recovery of the memory space. In this way, the performance of a foreground operation may be improved even though the number of the free blocks is insufficient.

A data processing system and electronic devices to which the memory system 110 including the memory device 150 and the controller 130, described above with reference to FIGS. 1 to 8, will be described in detail with reference to FIGS. 9 to 17.

Figure 9:
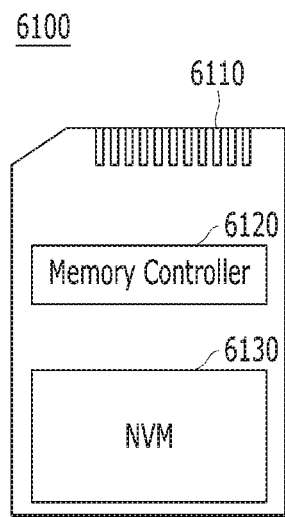
FIGS. 9 to 17 are diagrams schematically illustrating exemplary applications of a data processing system in accordance with various embodiments of the present disclosure.

FIG. 9 is a diagram schematically illustrating another example of a data processing system including a memory system in accordance with an embodiment. For example, FIG. 9 schematically illustrates a memory card system 6100 to which the memory system may be applied.

Referring to FIG. 9, the memory card system 6100 may include a memory controller 6120, a memory device 6130 and a connector 6110.

More specifically, the memory controller 6120 may be electrically connected to, and configured to access, the memory device 6130 embodied by a nonvolatile memory (NVM). For example, the memory controller 6120 may be configured to control read, write, erase and background operations of the memory device 6130. The memory controller 6120 may be configured to provide an interface between the memory device 6130 and a host, and to use firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a random access memory (RAM), a processor, a host interface, a memory interface and an error correction component.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), advanced technology attachment (ATA), serial-ATA, parallel-ATA, small computer system interface (SCSI), enhanced small disk interface (EDSI), integrated drive electronics (IDE), Firewire, universal flash storage (UFS), wireless fidelity (Wi-Fi or WiFi) and Bluetooth. Thus, the memory system and the data processing system may be applied to wired/wireless electronic devices including mobile electronic devices.

The memory device 6130 may be implemented by a nonvolatile memory (NVM). For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device to form a solid-state driver (SSD). Also, the memory controller 6120 and the memory device 6130 may be so integrated to form a memory card such as a PC card (personal computer memory card international association (PCMCIA)), a compact flash (CF) card, a smart media card (e.g., a SM and a SMC), a memory stick, a multimedia card (e.g., a MMC, a RS-MMC, a MMCmicro and an eMMC), a secure digital (SD) card (e.g., a SD, a miniSD, a microSD and a SDHC), and/or a universal flash storage (UFS).

Figure 10:
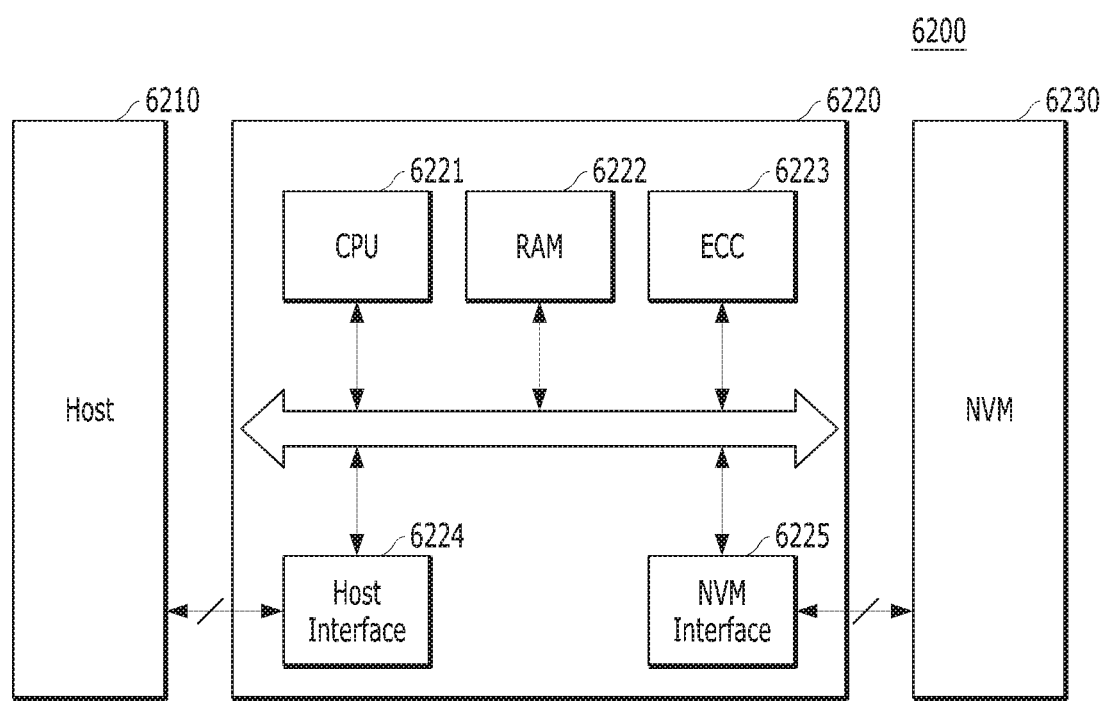

FIG. 10 is a diagram schematically illustrating another example of a data processing system 6200 including a memory system in accordance with an embodiment.

Referring to FIG. 10, the data processing system 6200 may include a memory device 6230 having one or more nonvolatile memories (NVMs) and a memory controller 6220 for controlling the memory device 6230. The data processing system 6200 illustrated in FIG. 10 may serve as a storage medium such as a memory card (e.g., CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more central processing units (CPUs) 6221, a buffer memory such as a random access memory (RAM) 6222, an error correction code (ECC) circuit 6223, a host interface 6224 and a memory interface such as an nonvolatile memory (NVM) interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an error correction code (ECC) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the low density parity check (LDDC) code, Bose-Chaudhri-Hocquenghem (BCH) code, turbo code, Reed-Solomon (RS) code, convolution code, recursive systematic code (RSC) or coded modulation such as trellis coded modulation (TCM) or block coded modulation (BCM).

The memory controller 6220 may exchange data with the host 6210 through the host interface 6224. The memory controller 6220 may exchange data with the memory device 6230 through the NVM interface 6225. The host interface 6224 may be connected to the host 6210 through a parallel advanced technology attachment (PATA) bus, a serial advanced technology attachment (SATA) bus, a small computer system interface (SCSI), an universal serial bus (USB), a peripheral component interconnect-express (PCIe) or a NAND interface. The memory controller 6220 may have a wireless communication function with a mobile communication protocol such as wireless fidelity (WiFi) or long term evolution (LTE). The memory controller 6220 may be connected to an external device, for example, the host 6210 or another external device, and then transmit/receive data to/from the external device. In particular, as the memory controller 6220 is configured to communicate with the external device according to one or more of various communication protocols, the memory system and the data processing system may be applied to wired/wireless electronic devices, particularly a mobile electronic device.

Figure 11:
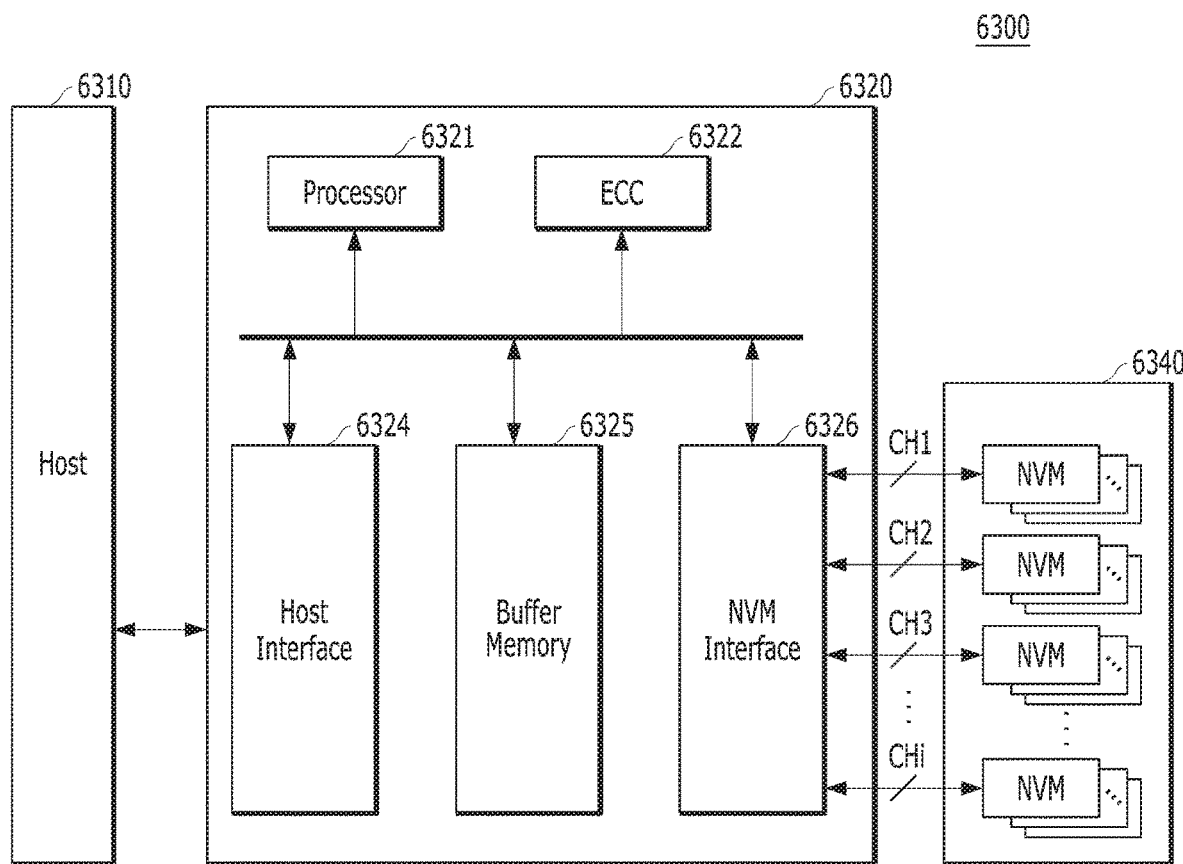

FIG. 11 is a diagram schematically illustrating another example of a data processing system including a memory system in accordance with an embodiment. For example, FIG. 11 illustrates a solid state drive (SSD) 6300 to which the memory system may be applied.

Referring to FIG. 11, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340. Further, the buffer memory 6325 may temporarily store meta data of the plurality of flash memories NVM, for example, map data including a mapping table. The buffer memory 6325 may be embodied by any of a variety of volatile memories such as a dynamic random access memory (DRAM), a synchronous DRAM (SDRAM), a double data rate (DDR) SDRAM, a low power DDR (LPDDR) SDRAM and a graphics RAM (GRAM) or nonvolatile memories such as a ferroelectric RAM (FRAM), a resistive RAM (RRAM or ReRAM), a spin-transfer torque magnetic RAM (STT-MRAM) and a phase-change RAM (PRAM). FIG. 11 illustrates that the buffer memory 6325 is embodied in the controller 6320. However, the buffer memory 6325 may be external to the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 may be applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 12:
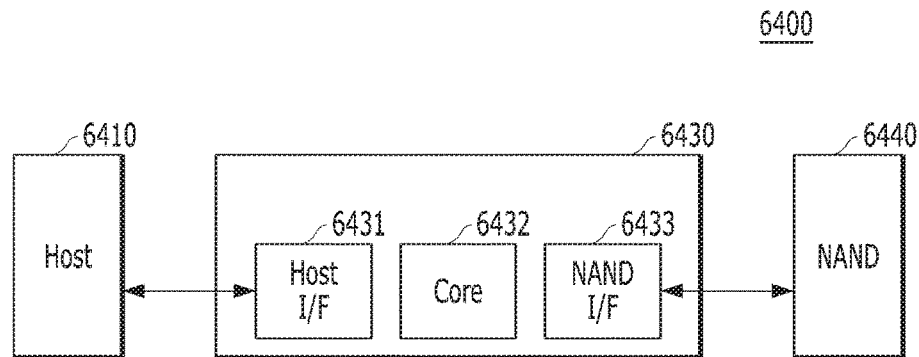

FIG. 12 is a diagram schematically illustrating another example of a data processing system including a memory system in accordance with an embodiment. For example, FIG. 12 illustrates an embedded multi-media card (eMMC) 6400 to which the memory system may be applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, ultra high speed (UHS)-I/UHS-II interface.

FIGS. 13 to 16 are diagrams schematically illustrating other examples of a data processing system including a memory system in accordance with embodiments. For example, FIGS. 13 to 16 schematically illustrate universal flash storage (UFS) systems to which the memory system may be applied.

Referring to FIGS. 13 to 16, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 10 to 12, and the UFS cards 6530, 6630, 6730, 6830 may be embodied in the form of the memory card system 6100 described with reference to FIG. 9.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI unified protocol (UniPro) in mobile industry processor interface (MIPI). Furthermore, the UFS devices 6520, 6620, 6720, 6820 and the UFS cards 6530, 6630, 6730, 6830 may communicate with each other through any of various protocols other than the UFS protocol, for example, universal storage bus (USB) Flash Drives (UFDs), a multi-media card (MMC), a secure digital (SD), a mini-SD, and a micro-SD.

Figure 13:
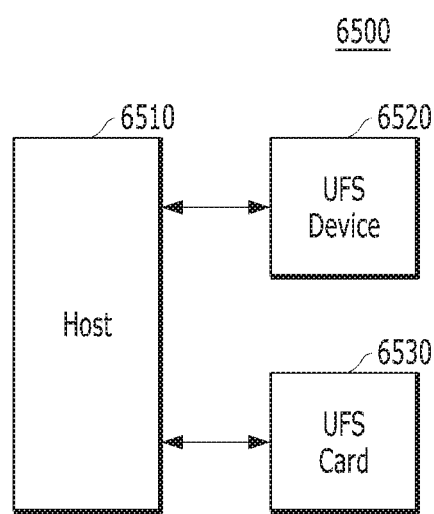

In the UFS system 6500 illustrated in FIG. 13, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, one UFS device 6520 and one UFS card 6530 are connected to the host 6510. However, a plurality of UFS devices and UFS cards may be connected in parallel or in the form of a star to the host 6410. A star formation is an arrangement in which a single device is coupled with plural devices for centralized operation. A plurality of UFS cards may be connected in parallel or in the form of a star to the UFS device 6520 or connected in series or in the form of a chain to the UFS device 6520.

Figure 14:
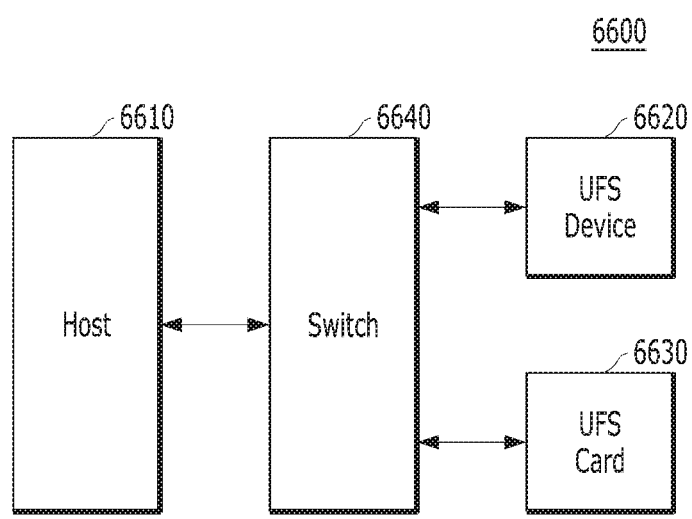

In the UFS system 6600 illustrated in FIG. 14, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, one UFS device 6620 and one UFS card 6630 are connected to the switching module 6640. However, a plurality of UFS devices and UFS cards may be connected in parallel or in the form of a star to the switching module 6640. A plurality of UFS cards may be connected in series or in the form of a chain to the UFS device 6620.

Figure 15:
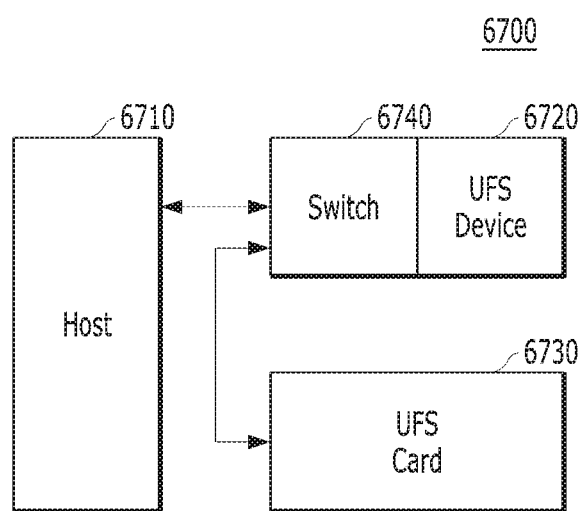

In the UFS system 6700 illustrated in FIG. 15, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro. The switching module 6740 may be integrated as one module with the UFS device 6720 inside or outside the UFS device 6720. In the illustrated embodiment, one UFS device 6720 and one UFS card 6730 are connected to the switching module 6740. However, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 16:
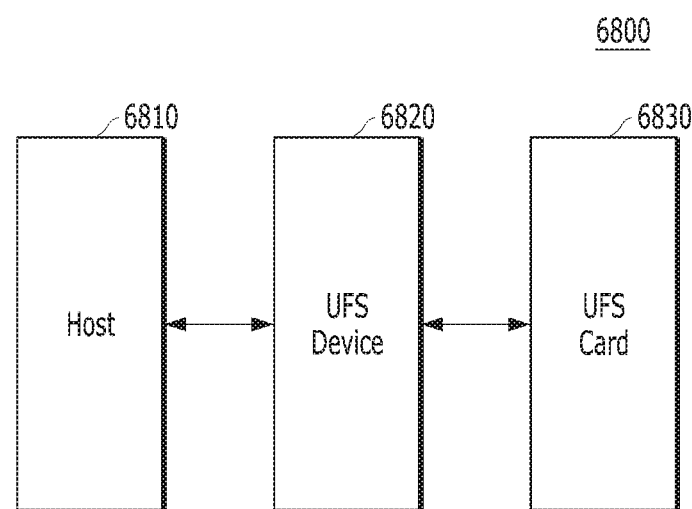

In the UFS system 6800 illustrated in FIG. 16, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target identifier (ID) switching operation. The host 6810 and the UFS card 6830 may communicate with each other through target ID switching between the M-PHY and UniPro modules of the UFS device 6820. In the illustrated embodiment, one UFS device 6820 is connected to the host 6810 and one UFS card 6830 is connected to the UFS device 6820. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 17:
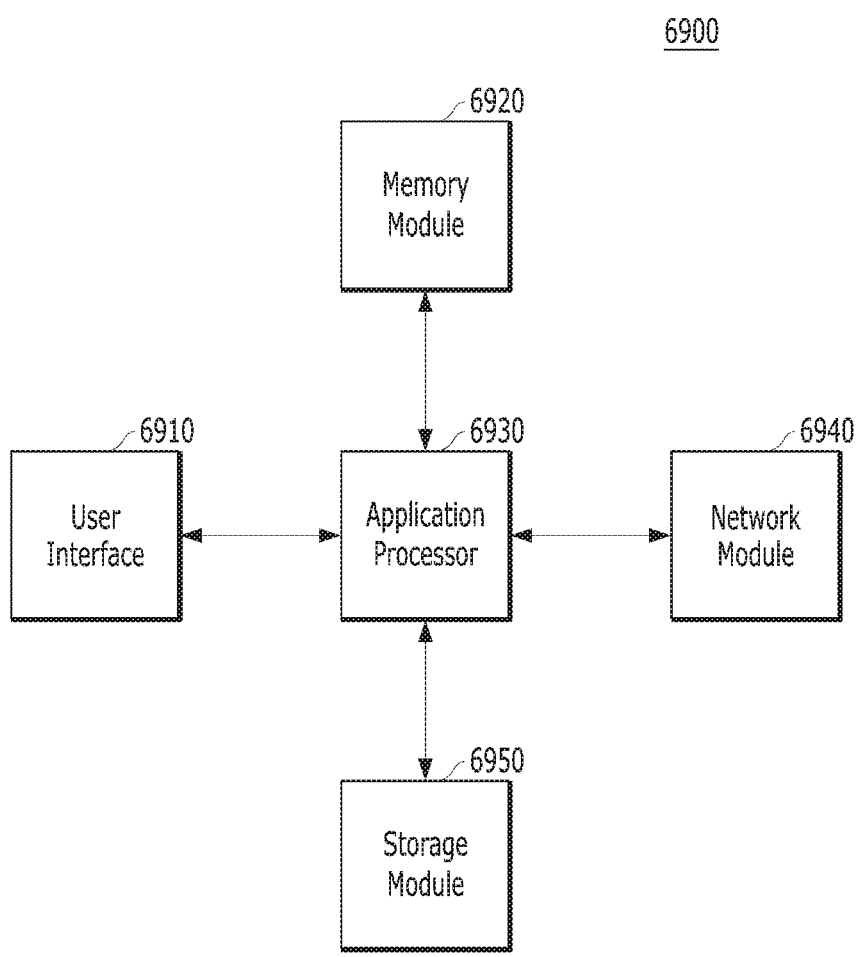

FIG. 17 is a diagram schematically illustrating another example of a data processing system including a memory system in accordance with an embodiment of the present disclosure. For example, FIG. 17 is a diagram schematically illustrating a user system 6900 to which the memory system may be applied.

Referring to FIG. 17, the user system 6900 may include a user interface 6910, a memory module 6920, an application processor 6930, a network module 6940 and a storage module 6950.

More specifically, the application processor 6930 may drive components in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, a DDR2 SDRAM, a DDR3 SDRAM, a low power DDR (LPDDR) SDARM, a LPDDR3 SDRAM or a LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on package on package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present disclosure, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, an eMMC and an UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to embodiments of the present disclosure, a memory system is provided that is capable of improving the performance of a foreground operation even though the memory space is insufficient by dynamically changing the cycle of a garbage collection operation based on the host workload.

While the present disclosure has been illustrated and described with respect to specific embodiments, it will be apparent to those skilled in the art in light of the present disclosure that various changes and modifications may be made without departing from the spirit and scope of the disclosure as defined in the following claims.

What is claimed is:

1. A memory system, comprising:
   a memory device including a plurality of closed memory blocks;
   an update block detector configured to calculate a total sum of valid page decrease amounts, and count a number of update blocks based on a number of valid pages of the closed memory blocks that are counted before and after a map update operation; and
   a garbage collector configured to perform a garbage collection operation on a victim block, when a number of free blocks in the memory device is less than a first threshold value and greater than or equal to a second threshold value; and the total sum of the valid page decrease amounts is less than or equal to a fourth threshold value,
   wherein the first threshold value is greater than the second threshold value,
   wherein the total sum of the valid page decrease amounts is obtained by summing up all valid page decrease amounts calculated for each of the closed memory blocks, and
   wherein the valid page decrease amounts represent differences between the number of the valid pages of the closed memory blocks counted after the map update operation and the number of the valid pages of the closed memory blocks counted before the map update operation.

2. The memory system of claim 1, further comprising:
   an urgent sensor configured to compare the number of the free blocks in the memory device with the first and second threshold values.

3. The memory system of claim 2, wherein the garbage collector performs a garbage collection operation on the victim block, when the number of the free blocks is less than the second threshold value.

4. The memory system of claim 1, further comprising:
   a valid page counter configured to count the number of the valid pages of the closed memory blocks before and after the map update operation.

5. The memory system of claim 1, wherein the update block is a closed memory block whose valid page decrease amount is not 0.

6. The memory system of claim 2, wherein each of the free blocks is a memory block whose number of empty pages is greater than or equal to a threshold value.

7. The memory system of claim 1, wherein each of the closed memory blocks is a memory block whose number of valid pages is not 0 and which is not an open block where a program operation is performed.

8. The memory system of claim 1, wherein the garbage collector performs the garbage collection operation by copying a valid data of the victim block into an empty page of a target block.

9. A method for operating a memory system, comprising:
   calculating a total sum of valid page decrease amounts; and
   counting a number of update blocks based on a number of valid pages of a plurality of closed memory blocks that are counted before and after a map update operation; and
   performing a garbage collection operation on a victim block, when a number of free blocks in a memory device is less than a first threshold value and greater than or equal to a second threshold value; and the total sum of the valid page decrease amounts is less than or equal to a fourth threshold value,
   wherein the first threshold value is greater than the second threshold value,
   wherein the total sum of the valid page decrease amounts is obtained by summing up all valid page decrease amounts calculated for each of the closed memory blocks, and
   wherein the valid page decrease amounts represent differences between the number of valid pages of the closed memory blocks counted after the map update operation and the number of the valid pages of the closed memory blocks counted before the map update operation.

10. The method of claim 9, further comprising:
comparing the number of the free blocks in the memory device with the first and second threshold values.

11. The method of claim 10, wherein the performing of the garbage collection operation comprises
performing a garbage collection operation on the victim block, when the number of the free blocks is less than the second threshold value.

12. The method of claim 9, further comprising:
counting the number of the valid pages of the closed memory blocks before and after the map update operation.

13. The method of claim 9, wherein the update block is a closed memory block whose valid page decrease amount is not 0.

14. The method of claim 10, wherein each of the free blocks is a memory block whose number of empty pages is greater than or equal to a threshold value.

15. The method of claim 9, wherein each of the closed memory blocks is a memory block whose number of valid pages is not 0 and which is not an open block where a program operation is performed.

16. The method of claim 9, wherein the performing of the garbage collection operation comprises
performing the garbage collection operation by copying a valid data of the victim block into an empty page of a target block.

* * * * *